United States Patent Office

2,870,209
Patented Jan. 20, 1959

2,870,209

KETONE PRODUCTS

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,492

15 Claims. (Cl. 260—590)

This invention relates to ketone products and more particularly to the reaction of aromatic sulfenyl halides with olefinic ketones and to certain new compounds obtained by this reaction.

The literature reports the addition of sulfenyl halides to certain olefinic compounds, but when the olefinic double bond of the addend is conjugated with a negative substituent, there is inhibition of such addition. Thus, Kharasch and Buess, J. Am. Chem. Soc. (1949), vol. 71, page 2726, first column, report that dinitrobenzenesulfenyl chloride would not add to the double bond of acrylonitrile, though this reagent had successfully been added to the double bond of other olefinic hydrocarbons such as styrene. Similarly, Turner and Connor, J. Am. Chem. Soc. (1947), vol. 69, page 1009, report failure to produce addition of 4-nitrobenzenesulfenyl chloride or of 4-chloro-2-nitrobenzenesulfenyl chloride to compounds in which the double bond is conjugated with a carbonyl, carbethoxyl or cyano group. Our experiments have confirmed this finding that nitrobenzenesulfenyl halides do not react with negatively-substituted olefins such as acrylonitrile under conditions normally leading to adduct formation when the sulfenyl halide is contacted with other olefins. It has now been found, however, that an olefinic ketone, wherein the olefinic double bond is conjugated with the ketone carbonyl group, can be successfully reacted with aromatic sulfenyl halides wherein the sulfenyl halide radical is attached to an aromatic radical which is a hydrocarbon or halogenated hydrocarbon radical.

The presently useful olefinic ketones wherein the double bond is conjugated with the carbonyl unsaturation may be represented by the formula

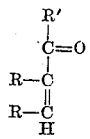

where R is selected from hydrogen and hydrocarbon radicals free of aliphatic unsaturation and containing from 1 to 6 carbon atoms, provided that at least one R is hydrogen, and R' is a hydrocarbon radical free of aliphatic unsaturation and containing 1 to 6 carbon atoms. By aliphatic unsaturation is herein meant carbon-to-carbon olefinic or acetylenic unsaturation. The vinyl ketones of the formula

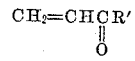

where R' is as defined hereinabove, are the particularly preferred members of this series, for reasons of ready availability and high reactivity. A particularly preferred olefinic ketone in the reaction of this invention is 3-buten-2-one. Exemplary of other vinyl ketones represented by the above formula are, e. g., 1-penten-3-one, 1-hexen-3-one, 5-methyl-1-hexen-3-one, acrylophenone, etc. Alternatively, there may be used, if desired, in the process of the invention, olefinic ketones wherein the olefinic carbon atoms are substituted by hydrocarbon radicals, e. g., an α-hydrocarbyl vinyl ketone such as 3-methyl-3-buten-2-one, or a β-hydrocarbyl vinyl ketone such as 4-phenyl-3-buten-2-one.

In accordance with this invention, an olefinic ketone wherein the olefinic unsaturation is conjugated with the ketone carbonyl unsaturation is reacted with an aromatic sulfenyl halide wherein the sulfenyl halide radical is attached to an aromatic radical selected from hydrocarbon radicals and halogenated hydrocarbon radicals containing up to 12 carbon atoms. Chlorine is the preferred substituent in the aromatic sulfenyl halides for the process of the invention; it is also possible to employ bromine or iodine, either on the aromatic radical or in the sulfenyl halide portion of the molecule, as substitutes for chlorine; the halogen fluorine is generally less reactive and may be employed as a substituent on the aromatic portion of the molecule in the embodiment of this invention which comprises the use of halogenated aromatic sulfenyl halides, but is not preferred in the sulfenyl halide portion of the present aromatic sulfenyl halides. The presently useful sulfenyl halides are those wherein the sulfenyl halide radical is attached directly to a nuclear carbon atom of an aromatic radical free of aliphatic unsaturation and containing up to 12 carbon atoms, said aromatic radical being selected from hydrocarbon radicals and halogenated hydrocarbon radicals. By an aromatic radical is herein meant a radical containing at least one benzene ring, which may be fused to another benzene ring or which may be substituted by alkyl radicals.

One class of presently useful aromatic sulfenyl halides are those wherein the sulfenyl halide radical is attached to an aromatic hydrocarbon radical. Particularly preferred in the present invention are monocyclic aromatic sulfenyl halides, e. g., benzenesulfenyl chloride, benzenesulfenyl bromide, toluenesulfenyl chloride, xylenesulfenyl chlorides, such as 2,4-xylenesulfenyl chloride, 2,6-xylenesulfenyl chloride, 3,5-xylenesulfenyl chloride, etc.; 2,4,5-trimethylbenzenesulfenyl chloride, 4-ethylbenzenesulfenyl chloride, 2,4-diethylbenzenesulfenyl chloride, 4-isopropylbenzenesulfenyl chloride, 2-methyl-4-isopropylbenzenesulfenyl chloride, 4-n-hexylbenzenesulfenyl chloride, etc. Mixed alkylbenzenesulfenyl halides such as mixed toluenesulfenyl chlorides or mixed xylenesulfenyl chlorides may also be used in the process of this invention. An additional class of presently useful sulfenyl halides wherein the sulfenyl halide is attached to an aromatic hydrocarbon radical are polycyclic aromatic sulfenyl halides, e. g., 1-naphthalenesulfenyl chloride, 2-naphthalenesulfenyl chloride, 4-biphenylsulfenyl chloride, 3-biphenylsulfenyl bromide, 4-cyclohexylbenzenesulfenyl chloride, 5,8-dimethylnaphthalenesulfenyl chloride, etc.

Another class of presently useful sulfenyl halides are those wherein the sulfenyl halide radical is attached to a halogenated aromatic radical. A preferred class of the halogenated aromatic sulfenyl halides are the monocyclic halogen-substituted benzenesulfenyl halides, e. g., 2-, 3-, or 4-chlorobenzenesulfenyl chloride, 4-bromobenzenesulfenyl chloride, 2,3-, 3,4-, or 2,4-dichlorobenzenesulfenyl chloride, 2,4,6 - trichlorobenzenesulfenyl chloride, 4-bromobenzenesulfenyl bromide, 2-chloro-4-bromobenzenesulfenyl chloride, 4-fluorobenzenesulfenyl chloride, 4-iodobenzenesulfenyl chloride, pentachlorobenzenesulfenyl chloride, etc. Alternatively, there may be employed in the process of the invention alkyl-substituted halogenated arenesulfenyl halides, e. g., 3-chloro-4-methylbenzenesulfenyl chloride, 2-chloro-4-methylbenzenesulfenyl chloride, 2,4 - dichloro - 3 - methylbenzenesulfenyl chloride, 2-chloro-4-isopropylbenzenesulfenyl chloride, 2,3-dimethyl-4-chlorobenzenesulfenyl chloride, 3,5-dichloro-4-neopentylbenzenesulfenyl chloride, chloromethylbenzenesulfenyl chloride, 3-chloro-4-chloromethylbenzenesulfenyl chloride, 2,3-bis-chloroethylbenzenesulfenyl chloride, 3-chloro-4-chloropropylbenzenesulfenyl chloride, etc. Illustrative of halogenated aromatic polycyclic sulfenyl halides which, when available, may also be employed in the process of the invention are, e. g., 5-chloronaphthalenesulfenyl chloride, 5,8-dichloronaphthalenesulfenyl chloride, 4'-chlorobiphenylsulfenyl chloride, etc.

In the present reaction, what we believe to occur is the formation of an adduct as illustrated by the following equation:

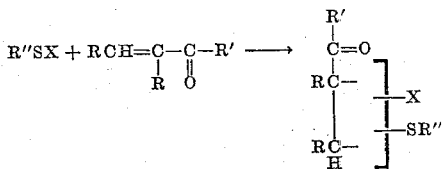

where

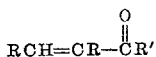

$$RCH=CR-\overset{O}{\overset{\|}{C}}R'$$

represents a vinyl ketone as defined above and R"SX represents an aromatic sulfenyl halide of the presently useful variety. The respective points of attachment of the sulfenyl halide halogen atom X and the arylthio radical in the resulting product are not known with certainty. Quite possibly, a mixture of α-halo-β-thio and β-halo-α-thio isomers is formed.

The present process is particularly valuable since alkyl ketones simultaneously substituted by a halogen atom and an arylthio group on adjacent carbon atoms do not appear to have been known hitherto. By the present discovery of the addition of aromatic sulfenyl halides to olefinic ketones there is afforded an inexpensive and facile synthesis of arylthio-substituted haloalkyl ketones.

Our present products having the adduct structure as shown above, may be characterized as 2(1)-halo-1(2)-(arylthio)alkyl ketones, where by such nomenclature is meant a 2-halo-1-(arythio)alkyl and/or 1-halo-2-(arylthio)alkyl ketone, aryl herein designating either an aromatic or a halogenated aromatic radical. Thus, the product of reaction of vinyl methyl ketone and 4-chlorobenzene-sulfenyl chloride in accordance with this invention is named as 1(2)-chloro-2(1)-(4-chlorophenylthio) ethyl methyl ketone.

Exemplary of the presently provided produtcs are, e. g., the products of reaction of 3-buten-2-one (methyl vinyl ketone) with monocyclic aromatic sulfenyl halides wherein the sulfenyl halide radical is attached to a hydrocarbon radical, e. g., 2(1)-chloro-1(2)-(phenylthio)ethyl methyl ketone, 2(1)-chloro-1(2)-(4-methylphenylthio) ethyl methyl ketone, 2(1)-chloro-1(2)-(tolylthio)ethyl methyl ketone, 2(1)-bromo-1(2)-(tolylthio)ethyl methyl ketone, 2(1)-chloro-1(2)-(xylthio)ethyl methyl ketone, 2(1)-iodo-1(2)-(tolylthio)ethyl methyl ketone, 2(1)-chloro-1(2)-(trimethylphenylthio)ethyl methyl ketone, 2(1)-chloro-1(2)-(tetramethylphenylthio)ethyl methyl ketone, 2(1)-chloro-1(2)-(4-ethylphenylthio)ethyl methyl ketone, 2(1)-chloro-1(2)-(2,4-dimethylphenylthio)ethyl methyl ketone, 2(1)-bromo-1(2)-(2-methyl-4-ethylphenylthio)ethyl methyl ketone, 2(1)-chloro-1(2)-(4-isopropylphenylthio)ethyl methyl ketone, etc. Illustrative of the products of reaction of methyl vinyl ketone in accordance with this invention with polycyclic aromatic hydrocarbon sulfenyl halides are, e. g., 2(1)-chloro-1(2)-(naphthylthio)ethyl methyl ketone, 2(1)-chloro-1(2)-(4-cyclohexylphenylthio)ethyl methyl ketone, 2(1)-bromo-1(2)-(4-biphenylthio)ethyl methyl ketone, etc. When a vinyl ketone of the formula $CH_2=CHCOR$ where R is a hydrocarbon radical higher than methyl is reacted with an aromatic sulfenyl halide wherein the sulfenyl halide is attached to a hydrocarbon radical, there are obtained products exemplified by 2(1)-chloro-1(2)-(phenylthio) ethyl ethyl ketone, 2(1)-chloro-1(2)-(tolylthio)ethyl ethyl ketone, 2(1)-chloro-1(2)-(xylylthio)ethyl ethyl ketone, 2(1)-bromo-1(2)--(xylylthio)ethyl ethyl ketone, 2(1)-chloro-1(2)-(2-methyl-4-ethylphenylthio)ethyl ethyl ketone, 2(1)-chloro-1(2)-(tolylthio)ethyl isopropyl ketone, 2(1)-chloro-1(2)-(biphenylthio)ethyl phenyl ketone, etc. Other presently provided adducts, derivable from hydrocarbon-arenesulfenyl halides include, e. g., 2(1)-chloro-1(2)-(phenylthio)-1-methylethyl methyl ketone, 2(1)-chloro-1(2)-(tolylthio)-1-methylethyl methyl ketone, 2(1)-bromo-1(2)-(phenylthio)-1-methylethyl methyl ketone, 2(1)-chloro-1(2)-(xylylthio)-1-phenylethyl methyl ketone, etc.

A particularly preferred embodiment of this invention comprises the reaction of one of the presently useful olefinic ketones with a halogenated aromatic sulfenyl halide. Exemplary of the adducts which may be obtained in accordance with this invention from halobenzenesulfenyl halides are, e. g., 2(1)-chloro-1(2)-(2-chlorophenylthio)ethyl methyl ketone, 2(1)-chloro-1(2)-(4-chlorophenylthio)ethyl methyl ketone, 2(1)-chloro-1(2)-(3,4-dichlorophenylthio)ethyl methyl ketone, 2(1)-bromo-1(2)-(2,4-dichlorophenylthio)ethyl methyl ketone, 2(1)-chloro-1(2)-(4-fluorophenylthio)-ethyl methyl ketone, 2(1)-chloro-1(2)-(2,4,5-trichlorophenylthio)ethyl methyl ketone, 2(1)-chloro-1(2)-(pentachlorophenylthio)ethyl methyl ketone, 2(1)-chloro-1(2)-(dibromophenylthio) ethyl ethyl ketone, 2(1)-chloro-1(2)-(4-chlorophenylthio)ethyl ethyl ketone, 2(1)-chloro-1(2)-(4-chlorophenylthio)ethyl isobutyl ketone, 2(1)-chloro-1(2)-(4-chlorophenylthio)ethyl phenyl ketone, 2(1)-chloro-1(2)-(4-chlorophenylthio)-1-methylethyl methyl ketone, etc. Exemplary of other presently afforded adducts derived from halogenated aromatic sulfenyl halides are, e. g., 2(1)-chloro-1(2)-(2-chloro-4-methylphenylthio)ethyl methyl ketone, 2(1)-chloro-1(2)-(4-chloromethylphenylthio)ethyl methyl ketone, 2(1)-chloro-1(2)-(hexachlorobiphenylthio)ethyl methyl ketone, etc.

It will be appreciated that the products of addition of the present aromatic sulfenyl halides to olefinic ketones are obtained as racemic mixtures of optical isomers, since the resulting compounds contain an asymmetric carbon atom. Optical isomers have the same physical properties, however, and are inseparable by ordinary techniques. It is intended that by the above-listed nomenclature utilized for products of the addition of aromatic sulfenyl halides to olefinic ketones, there should be understood that there is meant either the individual separated isomers or the racemic mixtures obtained in accordance with this invention.

In carrying out the present process, one of the presently useful olefinic ketones is simply contacted with one of the presently useful aromatic sulfenyl halides to form a reaction product comprising adducts of the sulfenyl halide with the olefinic ketone. The process of the invention as illustrated by the above equation involves the reaction of equimolecular amounts of sulfenyl halide and olefinic ketone, but, if desired, an excess of the more readily available reactant may be present in the reaction mixture to serve, e. g., as a diluent. The rapidity of reaction varies greatly, depending on the reactants chosen, some reactions requiring cooling and/or diluents to moderate the violence of the reaction, while others do not reach completion until after a period of refluxing at elevated temperatures. Suitable inert solvents and diluents which may be employed in the reaction mixture, if desired, include hydrocarbons such as benzene or hexane, halogenated solvents such as chloroform or ethylene dibromide, oxygenated solvents free of active hydrogen such as ether or dioxane, etc. A particularly preferred class of solvents are anhydrous organic carboxylic acids and especially glacial acetic acid, since this solvent also has the advantage of acting as a catalyst for the reaction. A mixture of carboxylic acid and solvents may also be used as a reaction medium, if desired.

The use of catalysts is not necessary, but is advantageous in promoting rapid reaction. Exemplary of catalysts which may be used in the present reaction, besides glacial acetic acid as mentioned above, are, e. g., acid catalysts such as a Friedel-Crafts catalyst, e. g., aluminum trichloride or a boron trifluoride complex catalyst. Pressure variation may also be utilized to facilitate the conduct of the invention, e. g., by carrying out the reaction in a pressure resistant vessel under autogenous pressure and at elevated temperatures.

Since the present unsaturated ketones are susceptible to thermal polymerization, the reaction is preferably conducted in the presence of polymerization inhibitors. Examples of suitable polymerization inhibitors are, e. g., hydroquinone, the monomethyl ether of hydroquinone, methylene blue, copper carbonate, selenium dioxide, etc.

The time required to accomplish the reaction and form the presently afforded products depends on functional factors such as the reactivity of the $\alpha,\beta$-olefinic ketone and the sulfenyl halide, the temperature of reaction, the presence or absence of catalysts, etc. Reaction rates and times of reaction may vary considerably, also, depending on details of apparatus or operational conditions. By modifications of the apparatus, continuous procedures may be substituted for the batch-type operations described below.

An indication of the progress of the reaction is a color change in the reaction mixture; generally, sulfenyl halides are a deep red color and the reaction mixture lightens as the sulfenyl halide is consumed. On completion of the reaction, conventional methods such as filtration, decantation, distillation, and evaporation may be employed to separate the product. It is to be noted that elevated temperatures employed during distillation may promote dehydrohalogenation of the present product, and are to be avoided except when conversion to an unsaturated compound is desired.

The details of modes of procedure in accordance with this invention are illustrated by the following non-limiting examples.

*Example 1*

To 14 g. (0.2 mole) of methyl vinyl ketone in 100 ml. of glacial acetic acid was added, dropwise, 35.7 g. (0.2 mole) of p-chlorobenzenesulfenyl chloride, while the temperature of the reaction mixture was held at below 25° C. by cooling. The sulfenyl halide was decolorized as it was added, and the ultimate reaction mixture was a pale yellow. After standing overnight, the reaction mixture was found to have darkened in color. By distillation, the product was separated as a dark yellow liquid, B. 142–143° C./0.7 mm., $n_D^{25}$ 1.5875. Infrared analysis of the product showed that it contained unconjugated carbonyl and no olefinic double bond absorption; the infrared spectrum also showed the presence of a methyl group and of a para-substituted phenyl ring. The identity of the product as 2(1)-chloro-1(2)-(4-chlorophenylthio)ethyl methyl ketone was confirmed by elementary analysis.

*Example 2*

When 14 g. of methyl vinyl ketone in glacial acetic acid are reacted with 31.7 g. (0.2 mole) of p-toluenesulfenyl chloride and the reaction mixture is filtered and poured into ice water, there is precipitated an oil consisting of 2(1)-chloro-1(2)-(4-methylphenylthio)ethyl methyl ketone.

Similarly, by the reaction of phenyl vinyl ketone with xylenesulfenyl chloride there is prepared 2(1)-chloro-1(2)-(xylylthio)ethyl phenyl ketone; by the reaction of 3-methyl-3-buten-2-one with chlorobenzenesulfenyl chloride there is prepared 2(1)-chloro-1(2)-(chlorophenylthio)-1-methylethyl methyl ketone, etc.

The presently afforded thio-substituted haloalkyl ketones are stable compounds ranging from liquid to solid crystalline materials and soluble in a variety of organic solvents, but essentially insoluble in water. They are useful for a wide variety of agricultural and industrial purposes. Thus, e. g., the present adduct may be dehydrohalogenated to produce olefinic monomers suitable for the production of polymers which may be cast into films or formed into molded articles, etc. The present ketones may also be employed in chemical syntheses, e. g., they may be reacted with trialkyl phosphites to produce phosphonyl-substituted compounds having biological toxicant properties and useful as oil additives, etc. The presently afforded ketones are also intrinsically active as biological toxicants and may be used, e. g., as insecticides, algicides, nematocides, herbicides, etc.; they are particularly adapted for use as constituents of microbiological toxicant compositions for the control of bacteria and fungi.

*Example 3*

This example describes the evaluation of one of the presently provided compounds as a microbiological toxicant.

2(1)-chloro-1(2)-(4-chlorophenylthio)ethyl methyl ketone, prepared as described in Example 1, was mixed in predetermined concentrations with hot sterile agar which was subsequently poured into Petri dishes, cooled and allowed to harden. Nutrient agar containing the test compound was then inoculated with the bacteria *Micrococcus pyogenes* var. *aureus* and *Salmonella typhosa* and Sabouraud's dextrose agar containing the test compound was inoculated with the fungus organism *Aspergillus niger*. The plates were incubated for 2 days at 37° C. It was found that the presence of this ketone gave 100% control of the growth of each of the above microorganisms at a concentration of 0.1% and was effective for the control of *S. typhosa* at concentrations down to 100 parts per million.

For parasiticidal purposes, the present ketones may be applied directly to the parasite or to the environment thereof, or may be employed as a constituent of toxicant compositions wherein the ketone is dissolved in an organic solvent to form a solution thereof, or suspended in water in the form of an aqueous dispersion or emulsion, or admixed with an inert finely divided powder to form a toxic dust.

It is also contemplated that the presently provided sulfur-containing reaction products which are (arylthio)-alkyl ketones, prepared by reaction of $\alpha,\beta$-olefinic ketones with aromatic or haloaromatic sulfenyl halides may be converted by oxidation (e. g., with hydrogen peroxide in acetic acid, potassium permanganate, chromic acid, etc.) into the corresponding sulfoxides and sulfones.

While the invention has been illustrated with reference to various particular preferred embodiments thereof, it will be appreciated that variations can be made without departing from the spirit and scope of the invention.

What is claimed is:

1. Thio-substituted haloalkyl ketones of the formula

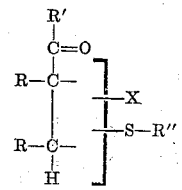

where each R is selected from hydrogen and hydrocarbon radicals free of aliphatic unsaturation and containing from 1 to 6 carbon atoms, provided that at least one R is hydrogen, R' is a hydrocarbon radical free of aliphatic unsaturation and containing from 1 to 6 carbon atoms, X represents a halogen atom, and R" is an aromatic radical attached to the sulfur atom by a nuclear carbon atom and selected from the class consisting of hydrocarbon radicals and halogenated hydrocarbon radicals, said radicals being free of aliphatic unsaturation and containing up to 12 carbon atoms.

2. Thio-substituted haloalkyl ketones of the formula

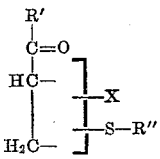

where R' represents a hydrocarbon radical free of aliphatic unsaturation and containing from 1 to 6 carbon atoms, X represents a halogen atom and R" represents a halogenated aromatic hydrocarbon radical free of aliphatic unsaturation and containing up to 12 carbon atoms, attached to the sulfur atom by a nuclear carbon atom.

3. Thio-substituted haloalkyl ketones of the formula

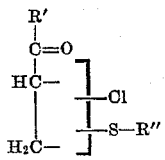

where R' represents an alkyl radical of up to 6 carbon atoms, and R" represents a halogenated monocyclic aromatic hydrocarbon radical free of aliphatic unsaturation and containing up to 12 carbon atoms, attached to the sulfur atom by a nuclear carbon atom.

4. Thio-substituted haloalkyl ketones of the formula

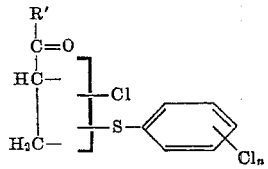

where $n$ is an integer of from 1 to 5, and R' represents an alkyl radical of up to 6 carbon atoms.

5. 2(1)-chloro-1(2)-(4-chlorophenylthio)ethyl methyl ketone.

6. Thio-substituted haloalkyl ketones of the formula

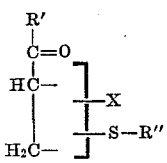

where R' represents an alkyl radical of up to 6 carbon atoms, X represents a halogen atom and R" represents an aromatic hydrocarbon radical free of aliphatic unsaturation and containing up to 12 carbon atoms, said hydrocarbon radical being attached to the sulfur atom by a nuclear carbon atom.

7. Thio-substituted haloalkyl ketones of the formula

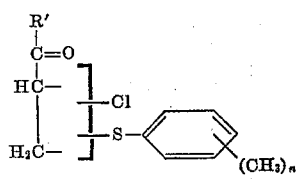

where $n$ is an integer of from 0 to 2, and R' represents an alkyl radical of up to 6 carbon atoms.

8. 2(1)-chloro-1(2)-(p-tolylthio)ethyl methyl ketone.

9. The method which comprises contacting an $\alpha,\beta$-olefinic ketone of the formula RCH=CRCOR', where each R is selected from the class consisting of hydrogen and hydrocarbon radicals free of aliphatic unsaturation and containing from 1 to 6 carbon atoms, provided that at least one R is hydrogen, and R' represents a hydrocarbon radical free of aliphatic unsaturation and containing from 1 to 6 carbon atoms, with a sulfenyl halide of the formula R"SX, where X represents a halogen atom and R" is an aromatic radical attached to the sulfur atom by a nuclear carbon atom and selected from the class consisting of hydrocarbon radicals and halogenated hydrocarbon radicals free of aliphatic unsaturation and containing up to 12 carbon atoms, and isolating from the resulting reaction product a thio-substituted haloalkyl ketone of the formula

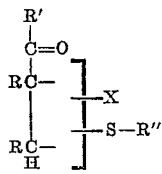

where R, R', R", and X are as defined hereinabove.

10. The method of claim 9, wherein the reaction is carried out in the presence of glacial acetic acid.

11. The method of claim 9, where said olefinic ketone is 3-buten-2-one and said sulfenyl halide is a halogen-substituted aromatic hydrocarbon sulfenyl chloride, wherein the sulfenyl chloride radical is attached to a nuclear carbon atom of an aromatic halogen-substituted hydrocarbon radical free of aliphatic unsaturation and containing up to 12 carbon atoms, the reaction being carried out in the presence of glacial acetic acid.

12. The method of claim 9, wherein said olefinic ketone is 3-buten-2-one and said sulfenyl halide is a chlorine-substituted benzenesulfenyl chloride of the formula

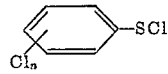

where $n$ is an integer of from 1 to 5 and the reaction is carried out in the presence of glacial acetic acid.

13. The method which comprises contacting 3-buten-2-one with p-chlorobenzenesulfenyl chloride in the presence of glacial acetic acid and isolating from the resulting reaction product 2(1)-chloro-1(2)-(4-chlorophenylthio)ethyl methyl ketone.

14. The method of claim 9, where said olefinic ketone is 3-buten-2-one and said sulfenyl halide is an aromatic sulfenyl chloride wherein the sulfenyl chloride radical is attached to a nuclear carbon atom of a hydrocarbon radical free of aliphatic unsaturation and containing up to 12 carbon atoms.

15. The method which comprises contacting 3-buten-2-one with p-toluenesulfenyl chloride in the presence of glacial acetic acid, and isolating from the resulting reaction product 2(1)-chloro-1(2)-(4-methylphenylthio)-ethyl methyl ketone.

References Cited in the file of this patent

Lecher et al.: Ber. Deut. Chem., vol. 58, p. 414 (1925).

Turner et al.: J. Am. Chem. Soc., vol. 69, pp. 1009–12 (1947).

Werner: Chem. Abstracts, vol. 44, p. 1093 (1950).